US006839877B2

(12) United States Patent
Iwata

(10) Patent No.: US 6,839,877 B2
(45) Date of Patent: Jan. 4, 2005

(54) E-MAIL TERMINAL AUTOMATICALLY CONVERTING CHARACTER STRING OF RECEPTION E-MAIL, AND E-MAIL SYSTEM

(75) Inventor: Shinichiro Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 666 days.

(21) Appl. No.: 09/727,679

(22) Filed: Dec. 1, 2000

(65) Prior Publication Data

US 2001/0003826 A1 Jun. 14, 2001

(30) Foreign Application Priority Data

Dec. 1, 1999 (JP) .......................................... 11-342055

(51) Int. Cl.[7] ................................................ G06F 17/00

(52) U.S. Cl. ........................ 715/500; 382/229; 707/104

(58) Field of Search ............................. 715/500.1, 522, 715/523, 524, 529, 532, 533, 540; 707/6, 101, 104; 341/28; 345/329; 704/1; 382/177, 181, 185, 224, 229

(56) References Cited

U.S. PATENT DOCUMENTS

| | | | | |
|---|---|---|---|---|
| 5,684,999 A | * | 11/1997 | Okamoto | 704/9 |
| 5,784,001 A | | 7/1998 | Deluca et al. | |
| 5,828,313 A | | 10/1998 | Mochizuki | |
| 6,252,588 B1 | * | 6/2001 | Dawson | 345/752 |
| 6,292,768 B1 | * | 9/2001 | Chan | 704/1 |
| 6,336,124 B1 | * | 1/2002 | Alam et al. | 715/523 |
| 6,674,372 B1 | * | 1/2004 | Ouyang | 341/28 |

FOREIGN PATENT DOCUMENTS

| | | |
|---|---|---|
| EP | 0686949 | 12/1995 |
| EP | 0817143 | 1/1998 |
| JP | 11-110373 | 4/1999 |
| WO | 96/11454 | 4/1996 |
| WO | 97/19429 | 5/1997 |

OTHER PUBLICATIONS

Search Report, UK, dated Feb. 14, 2002.
WPI, EPODOC, PAJ.
Copy of Japanese Office Action dated Feb. 25, 2003 (and English translation of relevant portion).

* cited by examiner

*Primary Examiner*—Sanjiv Shah
(74) *Attorney, Agent, or Firm*—Dickstein, Shapiro, Morin & Oshinsky, LLP

(57) ABSTRACT

An electronic mail terminal includes a display section, a conversion dictionary which stores sets of a character string and a pictograph, a receiving section and a control section. The conversion dictionary stores sets of a character string and a pictograph. The receiving section receives an electric mail including a sentence as a conversion object sentence in a reception mode. The control section automatically refers to the character string-pictograph conversion dictionary based on each of character strings of the conversion object sentence in the reception mode to retrieve a specific pictograph corresponding to the character string, when the pictograph corresponding to the character string is registered in the character string-pictograph conversion dictionary. Then, the control section converts the character string into the specific pictograph to produce a pictograph mixed sentence, and controls the display section to display the pictograph mixed sentence.

11 Claims, 10 Drawing Sheets

E-MAIL TERMINAL AUTOMATICALLY CONVERTING CHARACTER STRING OF RECEPTION E-MAIL, AND E-MAIL SYSTEM

BACKGROUND OF THE INVENTION

1. Field of the Invention

The present invention relates to an electronic mail terminal with a character string converting function and an electronic mail system.

2. Description of the Related Art

Recent years, a portable phone terminal is provided for a data transmission function in addition to a telephone function. The transmission and reception of an electronic mail is possible between such portable phone terminals by use of the data transmission function of the portable phone terminal. For this reason, in the portable phone terminal, it is generally made possible to input not only alphanumeric characters but also Japanese characters including Kanji characters. In this way, an advanced function is requested for character input and character display, while the portable phone terminal is requested to have a small size and a light weight. Therefore, it is an important key to create a sentence efficiently with few keys and also to display the sentence efficiently in a small display space.

Conventionally, a method of using a pictograph called an icon has been generally used in such a situation. For example, a pictograph associated with a bicycle is used when the character string of "bicycle" is to be inputted. This allows the creation of a sentence to be made easy without change the intention of the sentence, so that a display area can be saved. Such a technique is disclosed in Japanese Laid Open Patent Application (JP-A-Heisei 6-96056) as a first conventional example which describes a sentence creating technique using a pictograph. In the first conventional example, it is supposed that the Japanese sentence of "はれならてに" ("Harenara tenisuwo siyou"; "Let's play tennis, if whether is fine" in English) is inputted by a user and a pictograph conversion is Instructed. In this case, morpheme analysis is carried out to divide the Japanese sentence into the character strings of "すをしよう (hare)", "はれ (nara)", "なら (tenisu)", "てにす (wo)", and "を (siyou)". Then, a pictograph dictionary is used which stores a correspondence relation between phonetic expression and the pictograph of the Japanese character string. The pictograph dictionary is searched based on the character strings to retrieve pictographs corresponding to the character strings of "hare" and "tenisu". In this case, if there are a plurality of pictograph candidates for a single Japanese character string, the pictograph candidates are displayed for the user. The user selects one of the displayed pictograph candidates.

By the way, an electronic mail system between the portable phone terminals has been conventionally constructed. However, in recent years, it has become possible to connect the portable phone terminal to the Internet based on the standard of WAP (Wireless Application Protocol), so that an electronic mail which is sent on the Internet can be directly received by the portable phone terminal.

However, in the access to the Internet electronic mail by the portable phone terminal, there are following problems.

As the first problem, visibility is not good when the Internet electronic mail is displayed. As mentioned above, the pictographs are used in the conventional electronic mail transmission and reception between the portable phone terminals. However, no countermeasure is generally taken in the Internet electronic mail. That is, the electronic mail including pictographs cannot be sent. Therefore, when a long Internet electronic mail is displayed on a small display area of the portable phone terminal, a screen switching operation is required to switch the screens.

As the second problem, the whole sentence of an electronic mail sometimes can not be received when the long Internet electronic mail is received by the portable phone terminal. The reason is that the maximum electronic mail length is determined in the portable phone terminal electronic mail system, and a part of the electronic mail exceeding the maximum electronic mail length is not possible to be received by the portable phone terminal.

In conjunction with the above description, a communications system and a digital communication terminal are disclosed in Japanese Laid Open Patent Application (JP-A-Heisei 10-98544). In this reference, a control unit (22) adds an originator number or various messages, which are inputted from a key input section (21) to a sub-address data which should be transmitted to a terminal on the side of reception on originating call. Also, the control unit (22) adds a code to the head of the data to identify a classification of the data. Next, a transmitting and receiving section (10) and a communication control section (11) transmit the above sub-address data to the terminal on the side of reception on the originating call. On the other hand, in call arrival, a reception sub address recognizing section (15) receives the sub-address data, which is transmitted from the terminal on the side of transmission. The control unit (22) starts up a free character converting section (16), a fixed form sentence converting section (17), a pictograph converting section (18), and an originator number converting section (19) based on the code added to the sub-address data, and decodes the received data. The decoded data such as the originator number and the various messages are displayed on a display section. In this way, a message notice function and an originator number notice function can be realized between the different kinds of communications systems.

Also, an image processing apparatus is disclosed in Japanese Laid Open Patent Application (JP-A-Heisei 9-325958). In this reference, a character string before conversion is displayed in a display area (905) of a conversion screen, and a character string after the conversion is displayed in a display area (906). These character strings are displayed in units of rows character by character. A character string of "しょう" is specified and a pictograph converting button (1202) is clicked. At that time, pictographs corresponding to the string are carried to arrangement positions of the pictographs by a hamster CH1. The pictograph CH2 corresponding to the character string of "もじをへん" before the conversion is carried out above of the character of "かんする". Then, the character of "へん" is deleted from the screen.

SUMMARY OF THE INVENTION

Therefore, an object of the present invention is to provide an electronic mail terminal, in which a character string such as a word of a sentence of an electronic mail can be automatically converted into a pictograph.

Another object of the present invention is to provide an electronic mail terminal, in which a character string of a sentence of a transmission electronic mail can be automatically converted into a pictograph, even if it is the transmission electronic mail is created without using any pictographs.

Still another object of the present invention is to provide an electronic mail terminal, in which a character string of a sentence of a reception electronic mail can be automatically converted into a pictograph.

Yet still another object of the present invention is to provide an electronic mail terminal, in which meaning of a pictograph can be displayed, when a character string of a sentence of an electronic mail can be converted into the pictograph.

It is also an object of the present invention to provide an electronic mail system, in which a character string of a sentence of a transmission electronic mail can be automatically converted into a pictograph, even if it is the transmission electronic mail is created without using any pictographs.

In order to achieve an aspect of the present invention, an electronic mail terminal includes a display section, a conversion dictionary which stores sets of a character string and a pictograph, a receiving section and a control section. The conversion dictionary stores sets of a character string and a pictograph. The receiving section receives an electric mail including a sentence as a conversion object sentence in a reception mode. The control section automatically refers to the conversion dictionary based on each of character strings of the conversion object sentence in the reception mode to retrieve a specific pictograph corresponding to the character string, when the pictograph corresponding to the character string is registered in the conversion dictionary. Then, the control section converts the character string into the specific pictograph to produce a pictograph mixed sentence, and controls the display section to display the pictograph mixed sentence.

Here, one of the pictographs of the displayed pictograph mixed sentence may be specified. At this time, the control section may refer to the conversion dictionary based on the specified pictograph in the reception mode to retrieve the character string corresponding to the specified pictograph, and control the display section to display the retrieved character string. In this case, the control section may control the display section to display the pictograph mixed sentence and the retrieved character string at a same time.

Also, the electronic mail terminal may further include an input section used to input a sentence in a transmission mode. At this time, the control section may refer to the conversion dictionary based on a specified one of character strings of the inputted sentence in the transmission mode to retrieve a specific pictograph corresponding to the specified character string, when the pictograph corresponding to the specified character string is registered in the conversion dictionary. Then, the control section converts the specified character string into the specific pictograph to produce a pictograph mixed inputted sentence, and controls the display section to display the pictograph mixed inputted sentence. In this case, the electronic mail terminal may further include a transmitting section which transmits a transmission electronic mail in the transmission mode in response to a transmit instruction. The control section regards the pictograph mixed inputted sentence as the transmission electric mail and issues the transmit instruction.

Also, when the inputted sentence is a Kana sentence, and the conversion dictionary stores sets of a Kana character string and a Kanji character string, the control section refers to the conversion dictionary based on each of specified ones of Kana character strings of the inputted sentence in the transmission mode to converts the specified character string into Kanji characters to produce a Kanji converted sentence, and regards the Kanji converted sentence as the inputted sentence.

In another aspect of the present invention, a method of displaying an electronic mail, is attained by receiving an electric mail including a sentence as a conversion object sentence in a reception mode; by automatically converts each of character string into a pictograph in the reception mode to produce a pictograph mixed sentence when the pictograph corresponding to the character string is defined; and by displaying the pictograph mixed sentence.

In this case, the method may further include: specifying one of the pictographs of the displayed pictograph mixed sentence; determining a specific character string corresponding to the specified pictograph; and displaying the specific character string. In this case, the pictograph mixed sentence and the specific character string may be displayed at a same time.

Also, the method may further include: inputting a sentence in a transmission mode; converting a specified one of character strings of the inputted sentence a specific pictograph corresponding to the specified character string, to produce a pictograph mixed inputted sentence; and displaying the pictograph mixed inputted sentence.

Also, the method may further include: transmitting the pictograph mixed inputted sentence in the transmission mode.

Also, the method may be attained by converting each of specified ones of Kana character strings of the inputted sentence into Kanji characters in the transmission mode, when the inputted sentence is a Kana sentence, In order to achieve still another aspect of the present invention, an electronic mail relaying apparatus include a conversion dictionary, a receiving section, a transmitting section and a control section. The conversion dictionary stores sets of a character string and a pictograph. The receiving section receives a reception electric mail including a sentence. The control section automatically refers to the conversion dictionary based on each of character strings of the sentence of the reception electric mail to retrieve a specific pictograph corresponding to the character string, when the pictograph corresponding to the character string is registered in the conversion dictionary. Then the control section converts the character string into the specific pictograph to produce the transmission electric mail, and controls the transmitting section to transmit the transmission electronic mail.

In order to achieve yet still another aspect of the present invention, an electronic mail apparatus includes a conversion dictionary, an input section and a control section. The conversion dictionary stores sets of codes of a first expression format and codes of a second expression format, a code length of the first expression format codes being longer than that of the second expression format codes. The input section inputs an electric mail including a first sentence composed of sequences of the first expression format codes. The control section automatically refers to the conversion dictionary based on each of the sequences of the first expression format codes of the first sentence to retrieve a specific sequence of the second expression format codes, and converts the sequence of the first expression format codes into the specific sequence of the second expression format codes to produce a converted sentence.

Also, the electronic mail apparatus may further include an output section. In this case, the control section controls the output section to output an electronic mail including the converted sentence.

Also, when the input section inputs an electric mail including a second sentence composed of the sequences of first expression format codes and the sequences of second expression format codes, the control section automatically refers to the conversion dictionary based on each of the sequences of second expression format codes of the second sentence to retrieve a specific sequence of the first expression format codes, and converts the sequence of the second expression format codes into the specific sequence of first expression format codes to produce an original sentence. Also, when the electronic mail apparatus further includes a display section, the control section may control the display section to display the original sentence.

DESCRIPTION OF THE PREFERRED EMBODIMENTS

Next, an electronic mail terminal of the present invention will be described below in detail with reference to the attached drawings.

Figure 1:
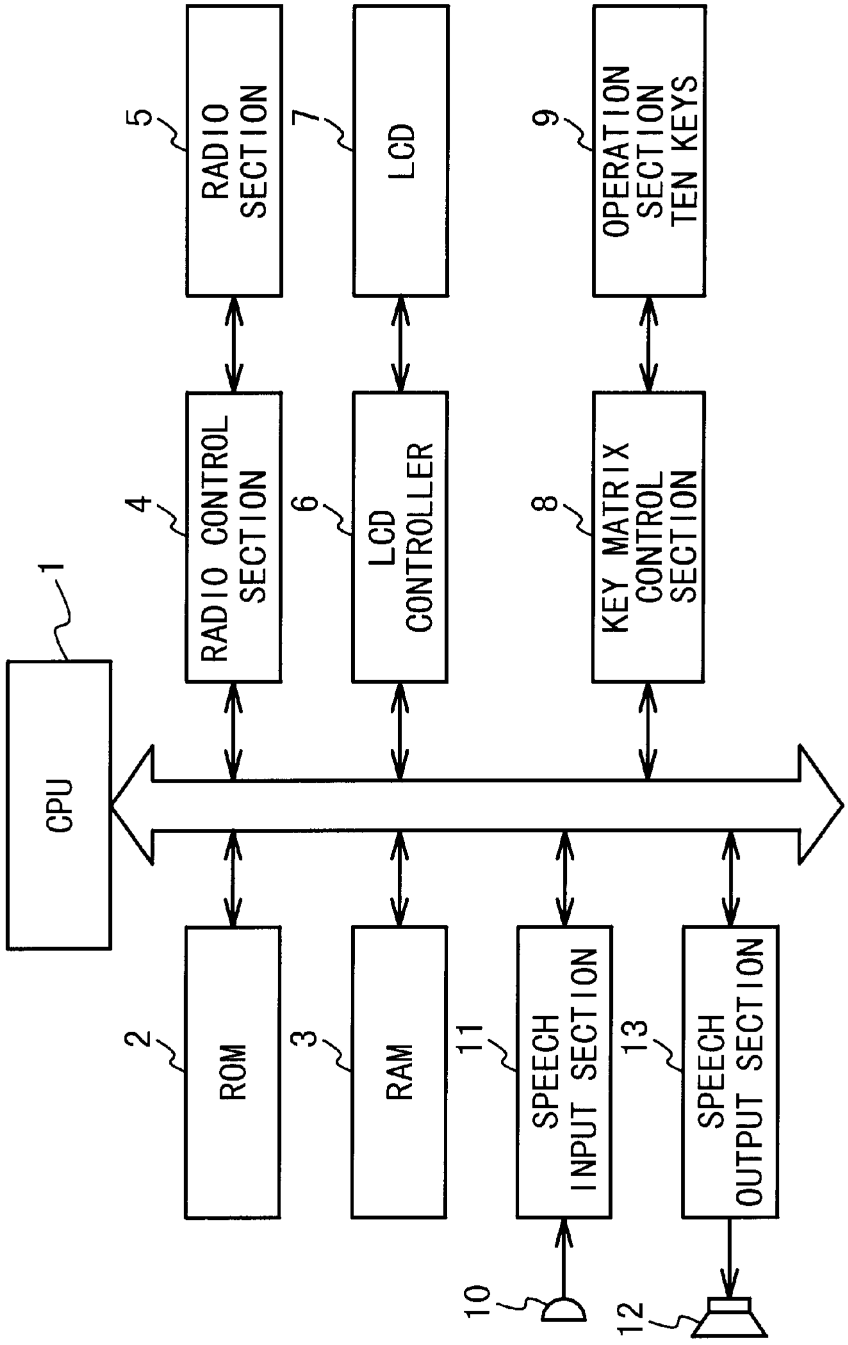
FIG. 1 is a block diagram showing the hardware structure of an electronic mail terminal according to the first embodiment of the present invention.

FIG. 1 is a block diagram showing the structure of a portable phone terminal with the electronic mail function as the electronic mail terminal according to the first embodiment of the present invention. Referring to FIG. 1, the portable phone terminal with the electronic mail function is composed of, as the hardware structure, a CPU 1, a ROM 2 connected with a bus 14, a RAM 3 used as a work area, a radio control section 4, an LCD controller 6, a key matrix control section 8, a speech input section 11, a speech output section 13, a radio section 5 connected with a radio control section 4, an LCD 7 connected with an LCD controller 6, numeric keys 9 connected with a key matrix control section 8, a microphone 10 connected with the speech input section 11, and a speaker 12 connected with the speech output section 13.

Various programs to operate the portable phone terminal, a Kana-Kanji conversion dictionary and a font data table are stored in the ROM 2. The CPU 1 controls each of the sections of the portable phone terminal in accordance with the programs stored in the ROM 2 to allow the terminal to function as the portable phone terminal with the electronic mail function. The functional block of the portable phone terminal realized by the hardware and the software is shown in FIG. 2.

Figure 2:
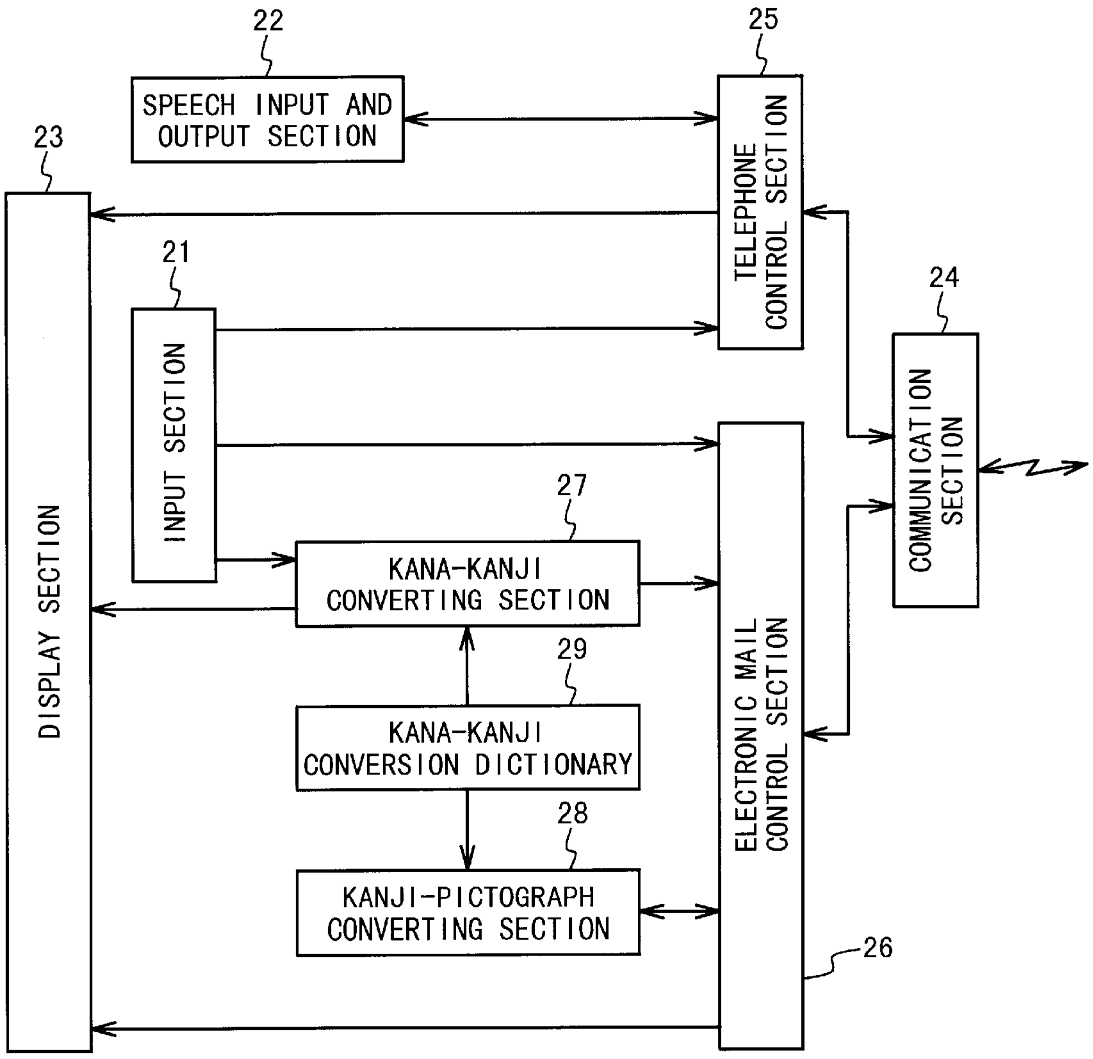
FIG. 2 is a functional block diagram showing the electronic mail terminal according to the first embodiment of the present invention.

Referring to FIG. 2, the portable phone terminal with the electronic mail function in this embodiment is composed of, as a functional blocks, an input section 21, a speech input/output section 22, a display section 23, a communication section 24, a telephone control section 25, an electronic mail control section 26, a Kana-Kanji converting section 27, a Kanji-Pictograph converting section 28 and a character string-pictograph conversion table 33. It should be noted that 29 denotes a Kana-Kanji conversion dictionary stored in the ROM 2.

The input section 21 is a functional block, which is realized by the key matrix control section 8, the numeric keys 9 and the programs. In the input section 21, the key operated on the numeric keys 9 is detected by the key matrix control section 8 and the detected key operation is notified to the CPU 1 in the form of an interrupt signal. The input section 21 is used to input various instructions and data by the user. A switching operation of whether the portable phone terminal is used as a portable phone or as an electronic mail terminal can be selected, and a dial number and a call originating instruction can be inputted when the portable phone terminal is used as the portable phone terminal. Also, transmission and reception instructions and a mail address and electronic mail sentences are inputted when the portable phone terminal is used as the electronic mail apparatus.

The speech input/output section 22 is a functional block which is realized by the microphone 10, the speech input section 11, the speaker 12, and the speech output section 13, and is mainly used at the time of the portable phone terminal. The speech input section 11 contains an amplifier, which amplifies an inputted speech signal from the microphone 10, and an analog-to-digital converter, which converts the amplified speech signal into a digital signal. The speech output section 13 contains a digital-to-analog converter, which converts a digital speech signal outputted from the CPU 1 into an analog signal, and an amplifier, which amplifies the analog signal.

The communication section 24 is a functional block, which is realized by the radio control section 4, the radio section 5 and the programs, and is used at the time of communication with another telephone using a portable phone network, and at the time of the Internet connection. The radio control section 4 carries out the control of communications protocols, and the radio section 5 contains a modulator, demodulator and a transmission and reception antenna.

The display section 23 is a functional block which is realized by the LCD controller 6, the LCD 7, a font data table (not shown) stored in the ROM 2 and the programs, and is used for the display of the dial number in the use as the portable phone and the display of a reception electronic mail in the use as the electronic mail terminal. An example of the font data and the internal structure example of the display section 23 are shown in FIGS. 3A and 3B.

The LCD controller 6 basically has only the function to control the LCD 7 to display a dot on a specified position. Therefore, font data as shown in FIG. 3A is used to display a character. The font data is prepared as a bit pattern in which a display required dot is "1" and a display not-required dot is "0" when a character is expressed in a square lattice as shown in FIG. 3A. The font data is a display bit pattern of the character itself so that an amount of data is large. Also, the font data to the same character are different depending on the structure of the display section. Thus, the compatibility between the fond data is low. Therefore, the character is managed in the form of a character code, when the character is manipulated in a case other than the display.

Figure 3A:
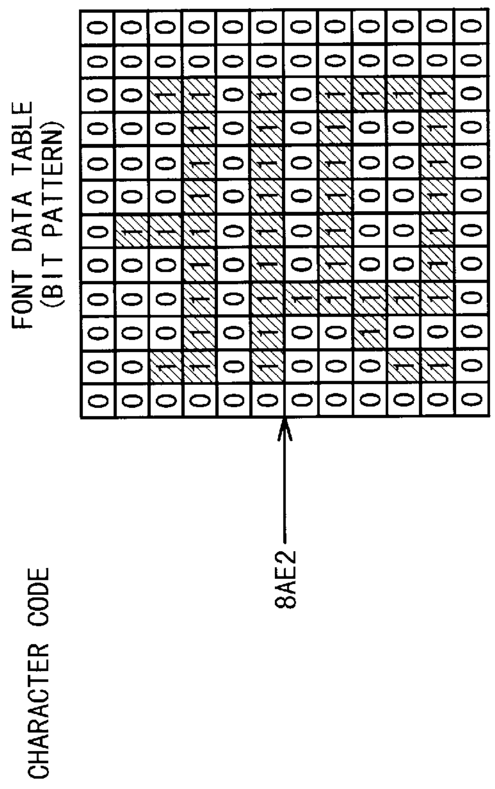
FIGS. 3A and 3B are a diagram showing an example of font data and an inner structure example of a display section.
Figure 3B:
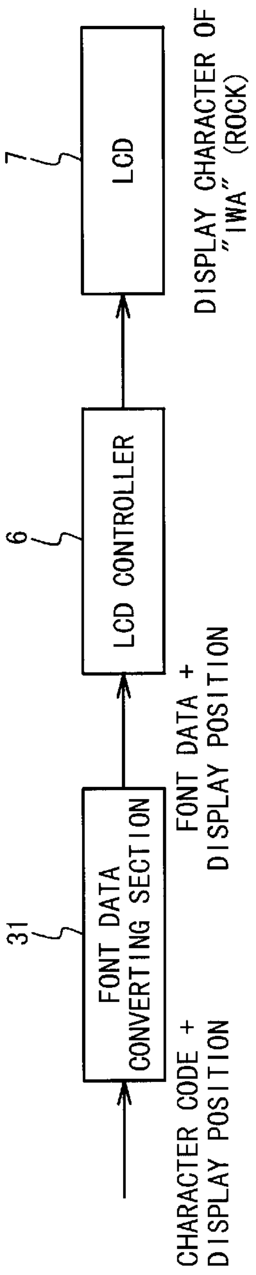

For example, as shown in FIG. 3A, the character code of "IWA" (rock in English) is predetermined to be "8AE2". Thus, the character code of "8AE2" can be recognized as the character of "IWA" in any apparatuses. In case of the display of the character on the display section 23, a display requesting source designates the character code and the display position data to output to the font data converting section 31. The font data converting section 31 is realized by the program, which is stored in the ROM 2. The font data converting section 31 refers to the font data table based on the character code to read out corresponding font data and display position data, and outputs a display request with the font data and the display position data to the LCD controller 6. The LCD controller 6 controls the LCD 7 in accordance with the display request to display the character pattern of "IWA" on the LCD 7. Like the character of "IWA", various pictographs are managed by use of the character codes and the font data.

The telephone control section 25 is a functional block, which is realized by the program, and is connected with the input section 21, the speech input/output section 22, the display section 23 and the communication section 24. The telephone control section 25 carries out the controls of general functions of the portable phone such as the transmission control and the reception control.

The electronic mail control section 26 is a functional block, which is realized by the program, and is connected with the input section 21, the display section 23, the communication section 24, the Kana-Kanji converting section 27 and the Kanji-Pictograph converting section 28. The electronic mail control section 26 carries out the control of general functions relating to the transmission and reception of an electronic mail.

The Kana-Kanji converting section 27 is a functional block, which is realized by the program. The Kana-Kanji converting section 27 has a function to refer to the Kana-Kanji conversion dictionary 29 to convert Kana characters inputted from input section 21 into kanji characters. An example of the Kana-Kanji conversion dictionary 29 is shown in FIG. 4.

Figure 4:
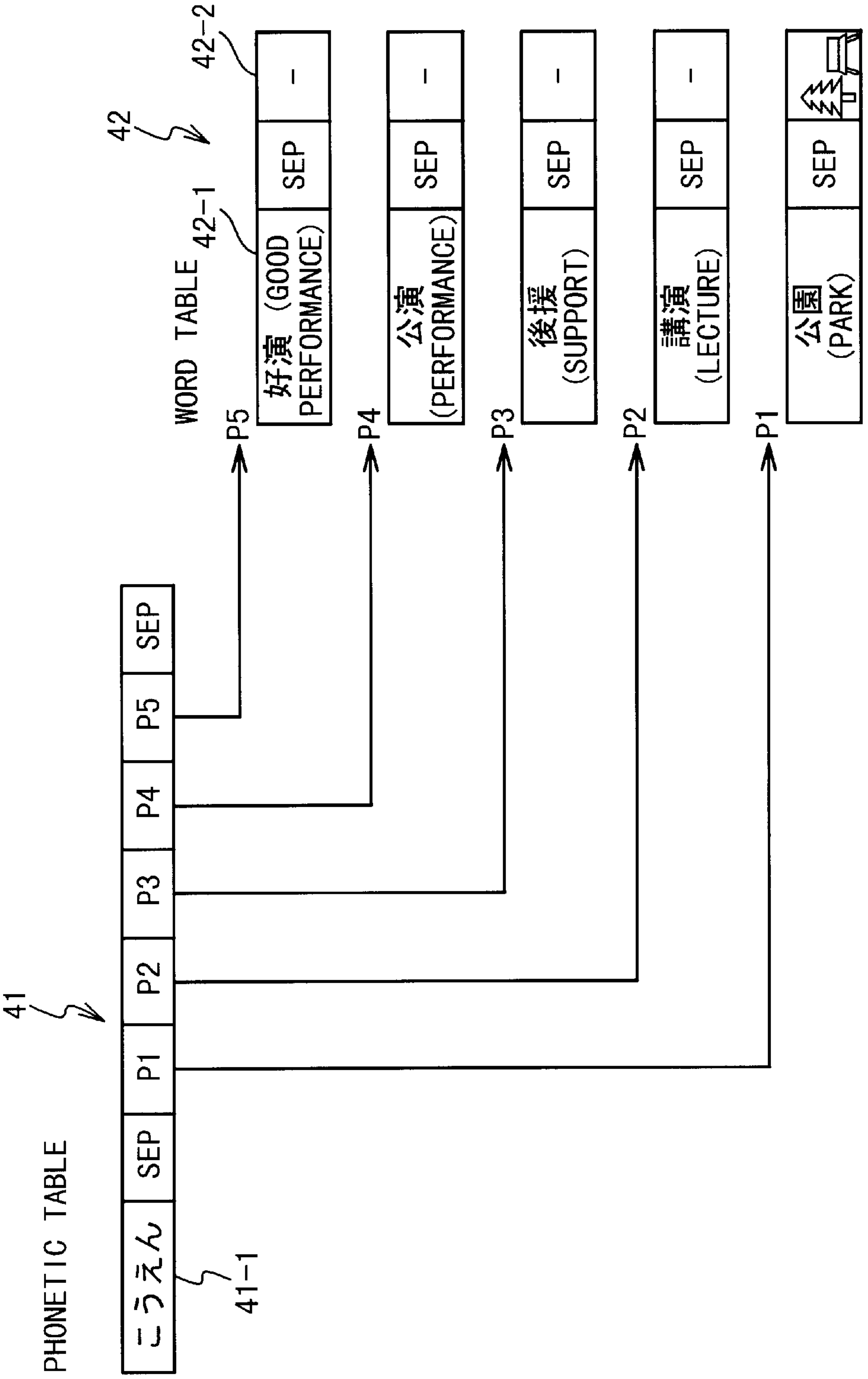
FIG. 4 is a diagram showing a structure example of a Kana-Kanji conversion dictionary.

Referring to FIG. 4, the Kana-Kanji conversion dictionary 29 is mainly composed of two kinds of tables of a phonetic table 41 and a word table 42.

The phonetic table 41 stores a set of records for a predetermined phonetic expression. One record corresponding to the phonetic expression is composed of a set of phonetic data 41-1 and a pointer (address) P1 to P5. The pointer points the address of a record corresponding to the phonetic expression in the word table 42. A separator code (Sep) divides the phonetic data 41-1 and the pointer.

The word table 42 stores a set of records for every word. One record corresponding to a word is composed of a set of word data 42-1 and pictograph data 42-2 corresponding to the word. A separator code (Sep) divides into the word data 42-1 and the pictograph data 42-1. The pictograph data 42-1 is previously written with a code of the pictograph, when the pictograph corresponding to the word exists, and is written with a NULL value (shown by "–" in FIG. 4), when the corresponding pictograph does not exist.

For example, it is supposed that the Kana character string of "kouen" is inputted from the user through the input section 21 and the Kana-Kanji conversion is instructed. The Kana-Kanji converting section 27 searches a phonetic table 41 for the records having the phonetic expression of "kouen". Then, the word table is searched based on the first pointer so that the Kanji character string of "へ" ("kouen"; "park" in English) is determined as a candidate. Thus, the Kanji character string of "へ" is displayed on the display section 23 for the user. When this Kanji character string of "へ" is not the candidate which the user wants, the Kanji character string of "ん" ("kouen"; "lecture" in English) which is stored in the address pointed by the second pointer P2 in response to the operation of the user operation is displayed as the next candidate. Hereinafter, similarly, "公園" ("kouen"; "support" in English), "講演" ("kouen"; "performance" in English), and "講演" ("kouen"; "good performances" in English) are appropriately displayed, and the user can select a desired candidate.

Also, it is supposed that the phonetic expression of "kouen" is inputted from the user through the input section 21 and the Kana-pictograph conversion is instructed. In this case, the records having the phonetic expression of "kouen" are searched from the phonetic table 41. Then, the pictograph of "へ" ("kouen"; "park" in English) stored in the record of the word table 42 which is pointed by the first pointer P1 of one of the searched records is displayed on the display section as a candidate for the user. When this candidate is not the candidate which the user wants, the next candidate is displayed, as in the Kana-Kanji conversion. However, in case of FIG. 4, only the pictograph of "へ" is stored in the word table 42 as the pictograph corresponding to the phonetic expression of "kouen". Therefore, the display of the next candidate is not carried out. It should be noted that a plurality of pictographs corresponding to the single phonetic expression might be displayed at a time so that the user can selects one of the plurality of pictographs.

By using the Kana-Kanji converting section 27 having the above mentioned function, the user creates an electronic mail sentence including the Kanji character strings and an electronic mail sentence including pictographs and can transmit the electronic mail to another portable terminal through the electronic mail control section 26.

Figure 5:
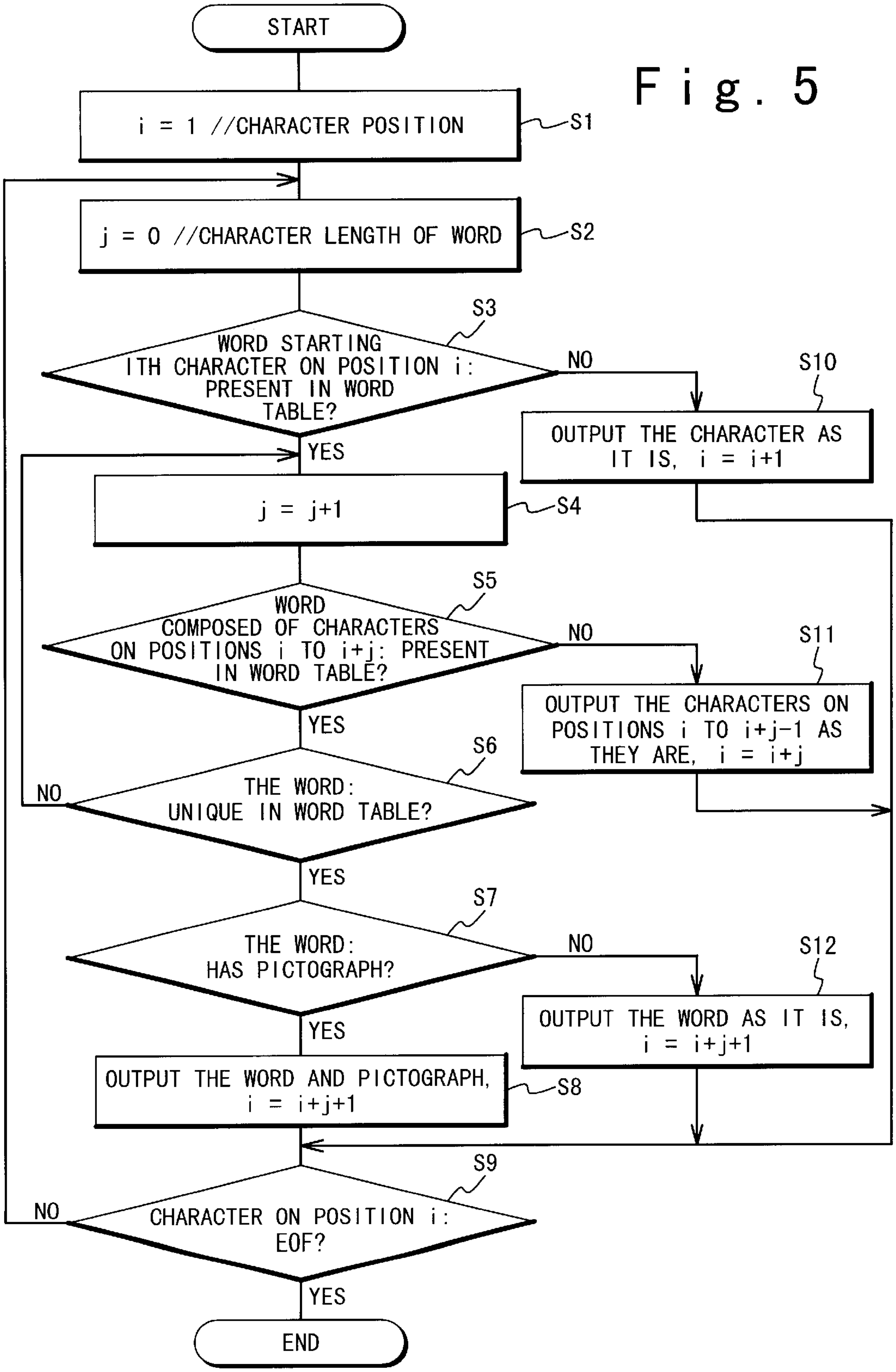
FIG. 5 is a flow chart showing an operation example at a Kanji-Pictograph converting section.

On the other hand, the Kanji-Pictograph converting section 28 receives the sentence of the received electronic mail from the electronic mail control section 26. Then, the Kanji-Pictograph converting section 28 refers to the Kana-Kanji conversion dictionary 29 based on the word (character string) of the electronic mail sentence, automatically substitutes a pictograph for the word and sends the substituted sentence back to the electronic mail control section 26. The above-mentioned Kana-Kanji converting section 27 converts "phonetic expression" into the pictograph but the Kanji-Pictograph converting section 28 converts the word in the electronic mail sentence into the pictograph directly without converting the word into the phonetic expression. More specifically, the word table 42 of FIG. 4 is searched using the word to be substituted of the electronic mail sentence as a key to retrieve the pictograph. An example of the processing is shown in FIG. 5. It should be noted that it is presupposed that an EOF (End Of File) code is stored as the last character of the electronic mail transferred from the electronic mail control section 26. In other words, the EOF code is stored as the eleventh character if the sentence is composed of the total number of characters of "10".

Referring to FIG. 5, at first, a variable i indicative of a character position is initialized to "1" and a variable j indicative of a word character length is initialized to "0" (steps S1 and S2). Subsequently, a determination is carried out to see whether or not the word starting with the character which exists on the character position i is registered on the word table 42 (step S3). When the word is not registered, the character, i.e., the character at the character position i is outputted just as it is. Also, the character position variable i is incremented by one (step S10). Then, when the next character is not the last character EOF (step S9), the control flow returns to the initial procedure.

When the word starting with the character on the character position i is registered on the word table 42, the word length j is incremented by one (step s4). Then, a determination is carried out to see whether the word composed of characters on the character positions i to i+j is registered on the word table 42 (step S5). For example, when the fourth character is "後援" ("ten"; "sky" or "heaven" in English) and the fifth character is "公演" ("ki"; "feeling" or "look" in English), and i is four and j is one, it is determined whether or not the word of "好演" ("tenki"; "weather" in English) is registered on the word table 42. When the word of "好演" is not registered, the characters on the character positions i to i+j−1 are outputted just as it is. Also, the character variable is set to the character position of i+j (step S11). If the next character is not the last character EOF (step S9), the control flow returns to the first procedure. In other words, the characters of the word determined at the step S5 other than the last character are outputted and the same procedure is started from the last character once again.

Next, it is determined whether or not the above-mentioned word is unique in the word table 42 (step S6). This means to determine whether or not a word composed of the word of "好演" in the above-mentioned example and characters following the word of "好演" is registered on the word table 42. Only, if the word is not unique, the control flow returns to the step S4, and the word length variable j is incremented by one to repeat the same procedure once again.

When the above-mentioned word is unique in the word table 42, it is determined whether or not the word has a pictograph in the word table 42 (step S7). When the word has the pictograph, the pictograph is outputted together with the character positions i and i+j (step S8). The character positions are outputted. When the word does not have the pictograph, the word is outputted just as it is (step S12). When setting the character position variable is set to i+j+1 in either case (steps S8 and S12). When the next character is not the last character EOF (step S9), the control flow returns to the initial procedure. In other words, the same procedure is repeated once again from the character next to the outputted word.

When the character of character position i is determined to be the EOF code in the step S9, the processing is ended at the point.

Next, the operation of the portable phone terminal with the electronic mail function in this embodiment having the above mentioned structure will be described. It should be noted that the operation when the portable phone terminal is used as the portable phone, and the operation when the portable phone terminal is used as the electronic mail apparatus are same as those of the conventional portable phone terminal with the electronic mail function. Therefore, a displaying operation of a reception electronic mail which is one feature of this embodiment will be described in detail.

Figure 6:
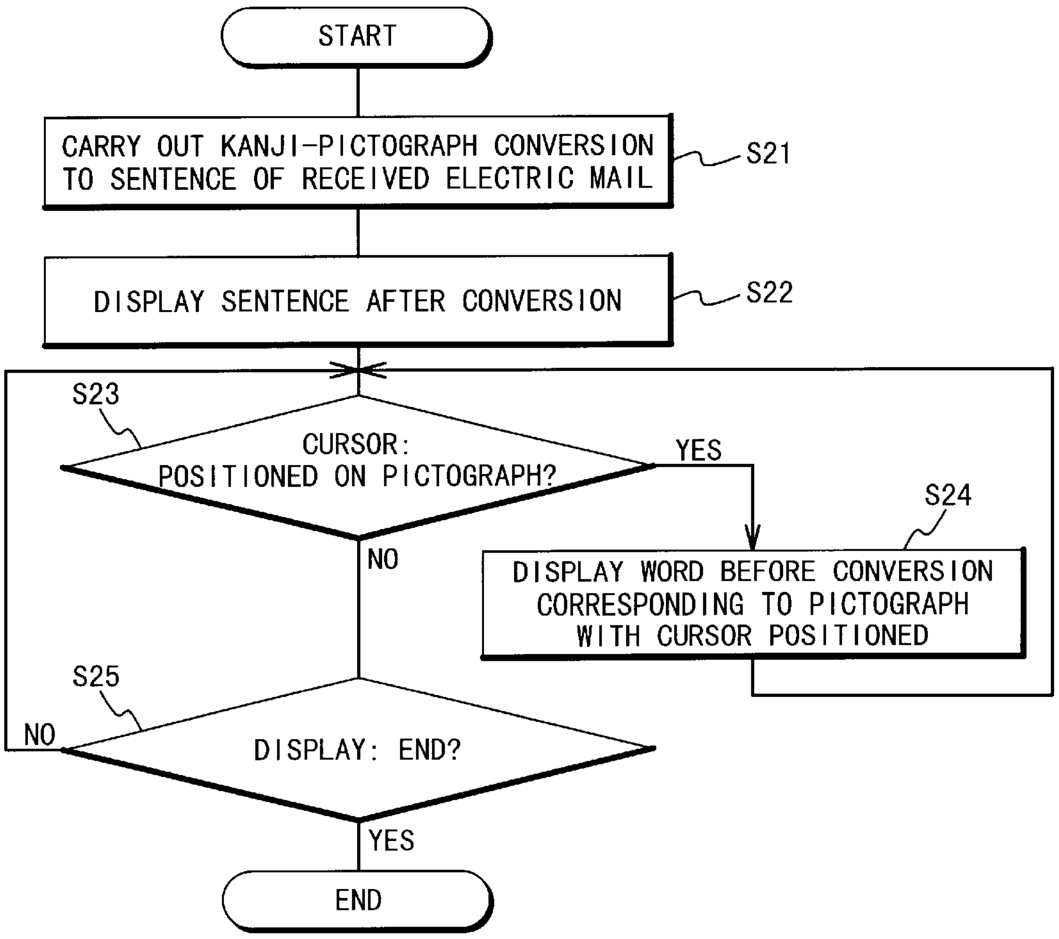
FIG. 6 Is a flow chart showing a reception electronic mail displaying operation example of the electronic mail control section.

For example, it is supposed that the Internet electronic mail is received by the communication section 24 through a portable phone network in response to an operation of the input section 21 by the user. In this case, the electronic mail control section 26 starts a reception electronic mail displaying process as shown in FIG. 6. First, the electronic mail sentence of the reception electronic mail is transferred to the Kanji-Pictograph converting section 28 to substitute pictographs for words in the electronic mail sentence (step S21). The operation of the Kanji-Pictograph converting section 28 in this case is already described with reference to FIG. 5. Then, the substituted electronic mail sentences and the position data of the word before the substitution for every pictograph are returned to the electronic mail control section 26. The electronic mail control section 26 transfers the returned electronic mail sentences and the returned display positions to the display section 23 such that the returned electronic mail sentences are displayed on a predetermined area of the LCD 7 (step S22).

After that, every time the pictograph in the displayed electronic mail sentences is pointed from the user by a pointing means such as a cursor (step S23). the electronic mail control section 26 supplies the word before the substitution corresponding to the pointed pictograph and the display positions of the word to display section 23 such that the electronic mail sentences including the word is displayed in another area of the LCD 7 (step S24). Then, when a display end instruction is supplied from the input section 21 (step S25), the process of FIG. 6 is ended. It should be noted that the word before the substitution corresponding to the pictograph is the word of the electronic mail sentences before the substitution which is specified by the character position data which is returned from the Kanji-Pictograph converting section 28 at the step S8 of FIG. 5 together with the pictograph.

Hereinafter, a specific example of the displaying method of reception electronic mail will be described.

Figures 7A, 7B, 7C:
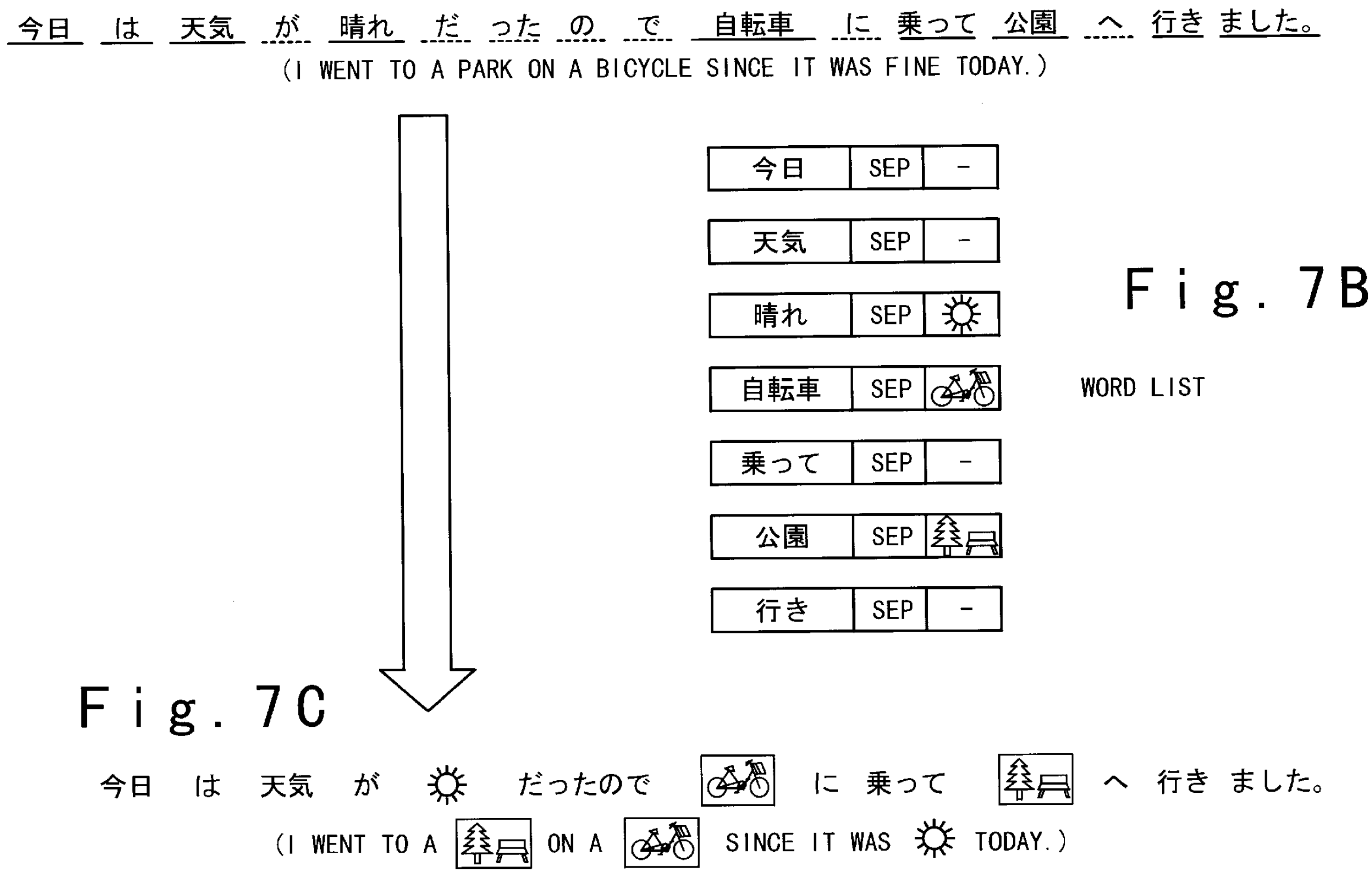
FIGS. 7A to 7C are diagrams showing a specific example of the operation of the Kanji-Pictograph converting section.

For example, it is supposed that the electronic mail of "天" (Kyouha haredattanode jitensyaninotte kouennhe ikimasita"; "I went to a park on a bicycle since it was fine today" in English) is received, as shown in FIG. 7A. When the reception electronic mail is transferred from the electronic mail control section 26, the Kanji-Pictograph converting section 28 refers to the word table 42 to words in the electronic mail sentence into the pictographs. FIG. 7B shows a list of words of the word table 42 which are coincident with the words of the electronic mail sentence. The word of "気" ("kyou"; "today" in English) is unique in the word table 42 but the pictograph is not defined or registered. Therefore, the word of "気" is outputted just as it is. Subsequently, because the word of "天気" ("wa") is not present in the word table 42, the word of "天気" is outputted just as it is. Similarly, the words of "好演" ("tenki") and "今日は天気が" ("ga") are outputted just as they are for the same reason. The word of "晴れだったの" ("hare"; "fine" in English) is uniquely present in the word table 42, and a pictograph is defined. Therefore, the pictograph is outputted in place of the word of "晴れだったの". Hereinafter, by following the procedure of FIG. 5, three words of "晴れだったの", "で自転車に乗" ("jitensya"; "bicycle" in English), and "へ" ("kouen"; "park" in English) are converted into the pictographs, as shown in FIG. 7C.

Figure 8A:
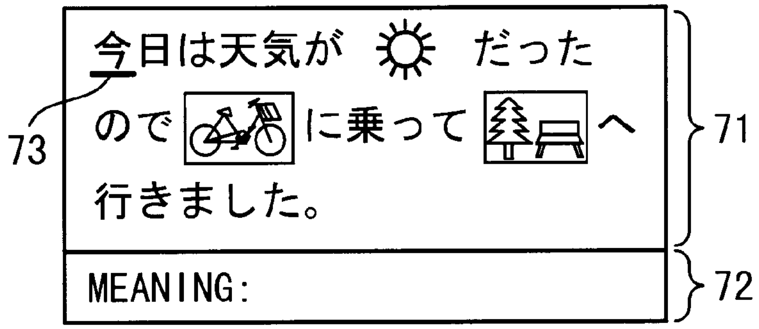
FIGS. 8A and 8B are diagrams showing an example of a display screen of a reception electronic mail.

The electronic mail control section 26 controls the display section to display the electronic mail sentence which is converted by the Kanji-Pictograph converting section 28, in a predetermined display area 71 of the LCD 7, as shown in FIG. 8A. At this point of time, a cursor 73 is located on not the pictograph but a character portion. Therefore, "meaning:" is only displayed in a display area 72 which is provided in a lower portion of the display area 71.

Figure 8B:
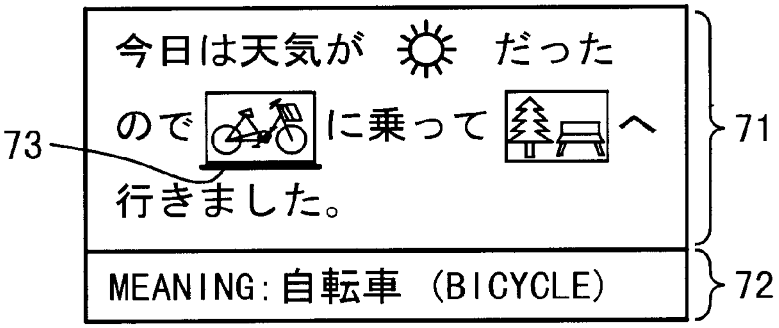

Next, when the cursor 73 is moved onto the pictograph which expresses the bicycle by the user as shown in FIG. 8B, the electronic mail control section 26 determines the word of "で自転車に乗" before the conversion based on the character position data and the reception electronic mail sentence which have been outputted from the Kanji-Pictograph converting section 28 together with the pictograph of the bicycle. Then, the word of "で自転車に乗" is displayed in the display area 72, as shown in FIG. 8B. This operation allows the user to easily recognize the meaning of the displayed pictograph, even if the user cannot recognize the meaning of the pictograph.

As mentioned above, the contents of an electronic mail is easy to understand when the electronic mail is read even if a display area is narrow. The reason is that the words are converted into the pictographs in case of display of the electronic mail so that the characters in the whole sentence can be decreased. Therefore, more data can be displayed in the narrow display area.

Also, the original sentence can be immediately referred to in case of pictograph display. The reason is that the original word before the conversion can be displayed when the user moves the cursor to the position of the pictograph in the display state of the converted electronic mail.

Also, it is not necessary to newly prepare a correspondence table of the word and the pictograph. The reason is that the conversion or substitution is realized by diverting the Kana-kanji conversion dictionary and by adding a pictograph to the word table.

It should be noted that in this embodiment, a word of the reception electronic mail sentence is always converted into a pictograph and displayed, when the pictograph corresponding to the word is registered. However, a flag may be provided in the electronic mail control section 26 to switch an effective state and invalid state of the pictograph converting function. In this case, only when this flag is set by the user to make the pictograph converting function effective, the word of the reception electronic mail sentence is automatically converted into the pictograph and displayed. Also, when the pictograph converting function is made invalid, the reception electronic mail sentence is displayed just as it is.

Also, as the word table, which stores the correspondence relation of the word and the pictograph, the Kana-Kanji conversion dictionary is used. However, the word table of exclusive use may be used. In this case, it is sufficient for only the words corresponding to the existing pictographs to be present in the word table.

Also, the word before the substitution corresponding to the pictograph specified by the cursor is determined from the original electronic mail sentence and the position data obtained in the converting process in the Kanji-Pictograph converting section 28. However, the record of the word table 42 is searched using the pictograph specified by the cursor as a key, to determine a word before the conversion.

Also, in this embodiment, the present invention is applied to the portable phone terminal with the electronic mail function. However, the present invention is possible to widely apply to the apparatus which has an electronic mail function.

In addition, a sentence inputted from the input section and composed of codes of a first expression format is subjected to the pictograph conversion to have codes of a second expression format. Then, the sentence including the pictographs is transmitted. On the reception end, the pictographs may be automatically returned to the character codes of the first expression format. In this case, the mail length to be transmitted can be shortened.

Figure 9:
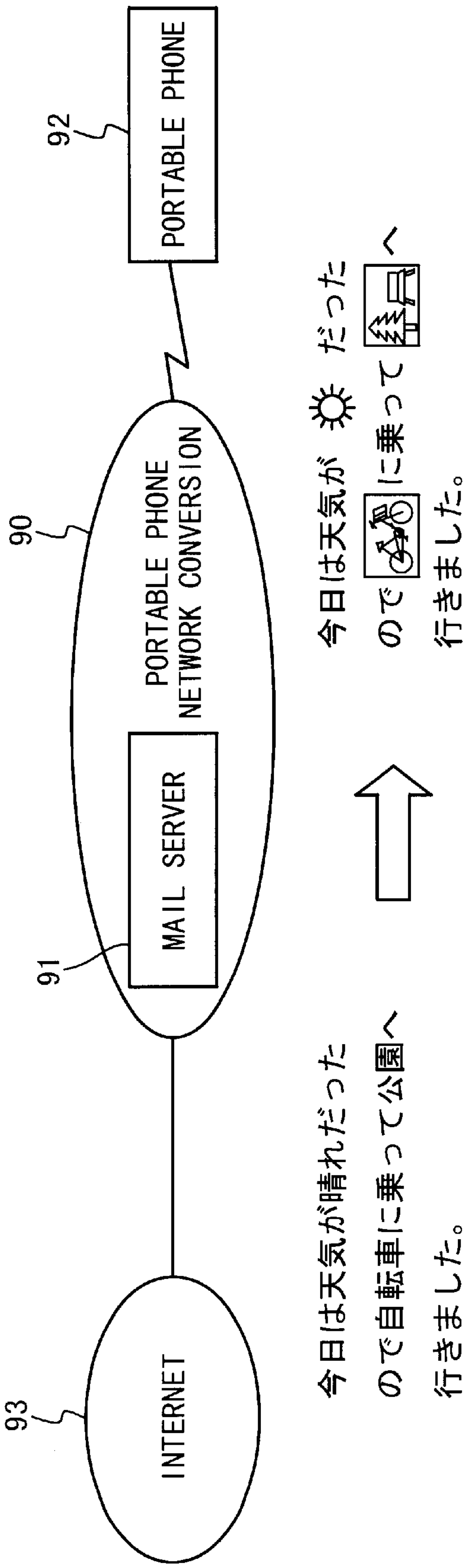
FIG. 9 is a block diagram of the second embodiment of the present invention.

In the first embodiment, the conversion from the word into the pictograph is carried out on the side of the terminal. However, in the second embodiment, the conversion is carried out in a mail server 91, which is provided in a portable phone network 90, as shown in FIG. 9. An electronic mail destined to a portable phone terminal 92 with the electronic mail function which is sent via the Internet 93 is accumulated in the mail server 91. The electronic mail which is stored in the mail server 91 is downloaded on the portable phone terminal 92 and is displayed. Therefore, if a word is converted into a pictograph in the mail server 91 before the download, the converting operation shown in the flow chart of FIG. 5 on the side of portable phone terminal 92 becomes unnecessary.

Figure 10:
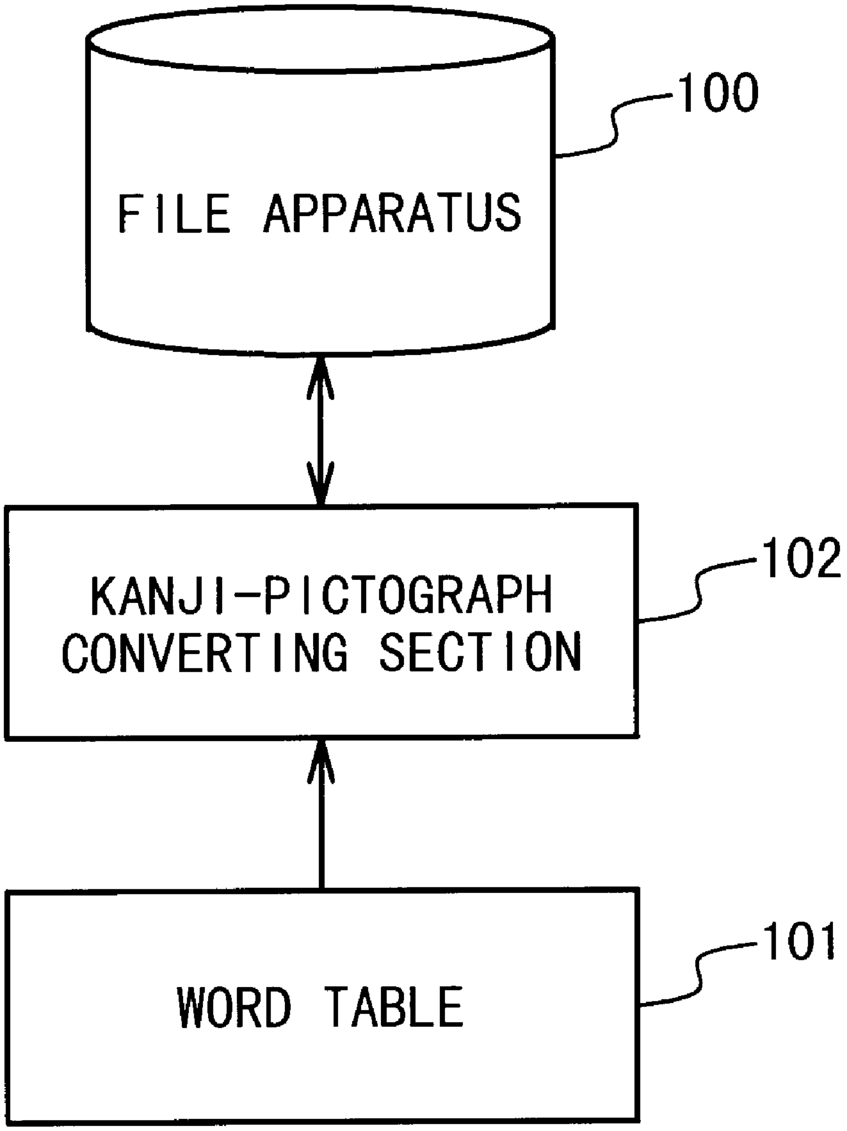
FIG. 10 is a block diagram showing an example of a pictograph converting mechanism provided for a mail server.

An example of the pictograph convert mechanism which is provided for the mail server 91 is shown in FIG. 10. A file apparatus 100 accumulates electronic mails destined to the portable phone terminal and sent via the Internet 93. A word table 101 is the table which stores correspondence relation of the word and the pictograph. A Kanji-Pictograph converting section 102 refers to the word table 101 to automatically convert words in the electronic mail sentence which is accumulated in the file apparatus 100 into the pictographs, in the same method as that of the Kanji-Pictograph converting section 28 of FIG. 2. The conversion may be carried out each time a new electronic mail is stored in the file apparatus 100. Instead, the conversion may be carried out to the electronic mail to be downloaded immediately before the portable phone terminal 92 downloads the electronic mail.

It should be noted that the existing portable phone 92 can be used just as it is as the portable phone terminal with the electronic mail function. However, the word table like the word table 101 may be provided. Also, a function may be provided to search the word table based on the pictograph specified by a cursor from the user to retrieve the word corresponding to the specified pictograph and to display the retrieved word on a display area 72, as shown in FIG. 8. In this case, the user can recognize the meaning of the displayed pictograph.

According to the second embodiment, the following effect is attained in addition to the effect in the first embodiment.

First, the first effect is in that it is possible to reduce the possibility that the whole text of the electronic mail is not displayed. In the portable phone electronic mail system often defines the maximum electronic mail length and the part of the electronic mail exceeding the maximum electronic mail length cannot be received on the side of the portable phone terminal. However, according to the present invention, the possibility to be against the limitation becomes low by previously converting words into pictographs on the side of the mail server so that the number of the characters in the sentence can be reduced.

The second effect is in that the resource load and the processing load on the side of the portable phone terminal can be reduced. It is not necessary to incorporate pictographs into the word table. Also, the converting operation shown in the flow chart of FIG. 5 is not necessary in case of electronic mail display.

The present invention is described using the embodiments. However, the present invention is not limited only to above embodiments and various types of additional modifications are possible. For example, in each of the embodiments, a word is converted into the pictograph. However, the present invention is not limited to the conversion of the word into the pictograph. In the present invention, an optional character string may be converted into a pictograph. The optional character string includes a word, an idiom composed of plurality of words, a phrase, and a sentence. Also, the present invention may be applied to a terminal of the English notation. In case of English, it is necessary to newly provide a table storing correspondence relation of an English word and a pictograph, because there is no system for Kana-Kanji conversion. In the case of English, the conversion from the word into the pictograph is easy because a word is separated from another word by a space.

As described above, the following effect is attained in accordance with the present invention.

The contents of an electronic mail is easy to understand when the electronic mail is read even if a display area is narrow. The reason is that the words are converted into the pictographs in case of display of the electronic mail so that the characters in the whole sentence can be decreased. Therefore, more data can be displayed in the narrow display area.

The original sentence can be immediately referred to in case of pictograph display. The reason is that the original word before the conversion can be displayed when the user moves the cursor to the position of the pictograph in the display state of the converted electronic mail.

It is not necessary to newly prepare a correspondence table of the word and the pictograph, by diverting the Kana-kanji conversion dictionary for adding a pictograph to the word table.

First, the first effect is in that it is possible to reduce the possibility that the whole text of the electronic mail is not displayed. In the portable phone electronic mail system often defines the maximum electronic mail length and the part of the electronic mail exceeding the maximum electronic mail length cannot be received on the side of the portable phone terminal. However, according to the present invention, the possibility to be against the limitation becomes low by previously converting words into pictographs on the side of the mail server so that the number of the characters in the sentence can be reduced. Also, because the converting process to the word table and the pictograph on the side of the terminal becomes unnecessary, there is an effect which a resource load and a processing load can be reduced on the side of the terminal.

What is claimed is:

1. An electronic mail terminal comprising: a display section; a conversion dictionary which stores sets of a character string and a pictograph; a receiving section which receives an electric mail including a sentence as a conversion object sentence in a reception mode; a control section which automatically refers to said conversion dictionary based on each of character strings of said conversion object sentence in said reception mode to retrieve a specific pictograph corresponding to said character string, when said pictograph corresponding to said character string is registered in said conversion dictionary, converts said character string into said specific pictograph to produce a pictograph mixed sentence, and controls said display section to display said pictograph mixed sentence.

2. The electronic mail terminal according to claim 1, wherein when one of said pictographs of the displayed pictograph mixed sentence is specified, said control section refers to said conversion dictionary based on said specified pictograph in said reception mode to retrieve the character string corresponding to said specified pictograph, and controls said display section to display said retrieved character string.

3. The electronic mail terminal according to claim 2, wherein said control section controls said display section to display said pictograph mixed sentence and said retrieved character string at a same time.

4. The electronic mail terminal according to claim 1, further comprising: an input section used to input a sentence in a transmission mode, and wherein said control section refers to said conversion dictionary based on a specified one of character strings of said inputted sentence in said transmission mode to retrieve a specific pictograph corresponding to said specified character string, when said pictograph corresponding to said specified character string is registered in said conversion dictionary, converts said specified character string into said specific pictograph to produce a pictograph mixed inputted sentence, and controls said display section to display said pictograph mixed inputted sentence.

5. The electronic mail terminal according to claim 4, further comprising: a transmitting section which transmits a transmission electronic mail in said transmission mode in response to a transmit instruction, and wherein said control section regards said pictograph mixed inputted sentence as said transmission electric mail and issues said transmit instruction.

6. The electronic mail terminal according to claim 5, wherein said inputted sentence is a Kana sentence, said conversion dictionary stores sets of a Kana character string and a Kanji character string, and said control section refers to said conversion dictionary based on each of specified ones of Kana character strings of said inputted sentence in said transmission mode to selectively convert said specified character string into a Kanji character string to produce a Kana-Kanji converted sentence, and regards said Kana-Kanji converted sentence as said inputted sentence.

7. An electronic mail relaying apparatus comprising: a conversion dictionary which stores sets of a character string and a pictograph; a receiving section which receives a reception electric mail including a sentence; a transmitting section; and a control section which automatically refers to said conversion dictionary based on each of character strings of said sentence of said reception electric mail to retrieve a specific pictograph corresponding to said character string, when said pictograph corresponding to said character string is registered in said conversion dictionary, converts said character string into said specific pictograph to produce said transmission electric mail, and controls said transmitting section to transmit said transmission electronic mail.

8. An electronic mail apparatus comprising: a conversion dictionary which stores sets of codes of a first expression format and codes of a second expression format, a code length of said first expression format codes being longer than that of said second expression format codes; an input section which inputs an electric mail including a first sentence composed of sequences of said first expression format codes; and a control section which automatically refers to said conversion dictionary based on each of said sequences of said first expression format codes of said first sentence to retrieve a specific sequence of said second expression format codes, and converts said sequence of said first expression format codes into said specific sequence of said second expression format codes to produce a converted sentence.

9. The electronic mail apparatus according to claim 8, further comprising: an output section, and wherein said control section controls said output section to output an electronic mail including said converted sentence.

10. The electronic mail apparatus according to claim 9, wherein when said input section inputs an electric mail including a second sentence composed of said sequences of first expression format codes and said sequences of second expression format codes, said control section automatically refers to said conversion dictionary based on each of said sequences of second expression format codes of said second sentence to retrieve a specific sequence of said first expression format codes, and converts said sequence of said second expression format codes into said specific sequence of first expression format codes to produce an original sentence.

11. The electronic mail apparatus according to claim 10, further comprising a display section, and said control section controls said display section to display said original sentence.

* * * * *